US008527659B2

(12) United States Patent
Deprun

(10) Patent No.: US 8,527,659 B2
(45) Date of Patent: Sep. 3, 2013

(54) METHOD AND SYSTEM FOR OPTIMIZING CPNS ENABLER

(75) Inventor: Jean-Francois Deprun, Paris (FR)

(73) Assignee: LG Electronics Inc., Seoul (KR)

( * ) Notice: Subject to any disclaimer, the term of this patent is extended or adjusted under 35 U.S.C. 154(b) by 101 days.

(21) Appl. No.: 13/320,445

(22) PCT Filed: May 14, 2010

(86) PCT No.: PCT/KR2010/003058
§ 371 (c)(1),
(2), (4) Date: Nov. 14, 2011

(87) PCT Pub. No.: WO2010/134722
PCT Pub. Date: Nov. 25, 2010

(65) Prior Publication Data
US 2012/0072549 A1    Mar. 22, 2012

Related U.S. Application Data

(60) Provisional application No. 61/179,000, filed on May 17, 2009.

(51) Int. Cl.
*G06F 15/16* (2006.01)
(52) U.S. Cl.
USPC ............ 709/246; 709/203; 709/247; 370/328

(58) Field of Classification Search
USPC ................ 709/203, 217, 246, 247; 370/328, 370/352, 401; 455/414.4
See application file for complete search history.

(56) References Cited

U.S. PATENT DOCUMENTS

2005/0216421 A1 *   9/2005   Barry et al. ..................... 705/64

FOREIGN PATENT DOCUMENTS

| EP | 1 715 657 A1 | 10/2006 |
| EP | 1 748 600 A1 | 1/2007 |

* cited by examiner

*Primary Examiner* — Frantz Jean
(74) *Attorney, Agent, or Firm* — Birch, Stewart, Kolasch & Birch, LLP

(57) ABSTRACT

A method and apparatus for providing enhanced functionalities in a CPNS enabler are discussed. According to an embodiment, a method includes receiving content translation capability information and function information from each of the CPNS entities; compiling CPNS translator information for the CPNS enabler based on the content translation capability information and the function information; receiving a request to translate a content along with the content from a certain CPNS entity among the CPNS entities; determining whether a CPNS server can translate the content in response to the request based on the CPNS translator information; translating the content if the determining step indicates that the CPNS server can translate the content; and transmitting the translated content to the certain CPNS entity.

20 Claims, 3 Drawing Sheets

Other servers | CPNS Servers | CPNS Gateways | PNEs | Other devices

Fig. 4

| UNIT | (1) Functions<br>(2) Content Translators |
|---|---|
| CPNS Server | (1) AVI, MPEG, WMV, MOV, QuickTime, DVD, 3GP<br>(2) AVI ->DVD, AVI->3GP, 3GP-> QuickTime, WMV-MPEG |
| GW 1 | (1) QuickTime, rm, flv, DVD, 3GP<br>(2) 3GP-> QuickTime, WMV-> DVD |
| GW 2 | (1) AVI, MPEG<br>(2) DVD->AVI |
| GW 3 | (1) AVI, MPEG, rm, flv, DVD, 3GP |
| GW 4 | (1) QuickTime, rm, flv<br>(2) AVI->flv |
| PNE 1 | (1) AVI, MPEG, WMV<br>(2) QuickTime->AVI |
| PNE 2 | (1) AVI, MPEG, WMV, MOV, QuickTime |
| PNE 3 | (1) AVI, MPEG, WMV, MOV |
| PNE 4 | (1) AVI, MPEG, WMV, MOV, QuickTime, rm, flv, DVD, 3GP |
| Device 1 | (1) WMV |
| Device 2 | (1) QuickTime |
| Device 3 | (1) WMV |
| Device 4 | (1) AVI, MPEG, WMV |
| Device 5 | (1) DVD |
| EXTERNAL SERVER | (1) AVI, MPEG, MOV<br>(2) DVD->AVI |

Fig. 5

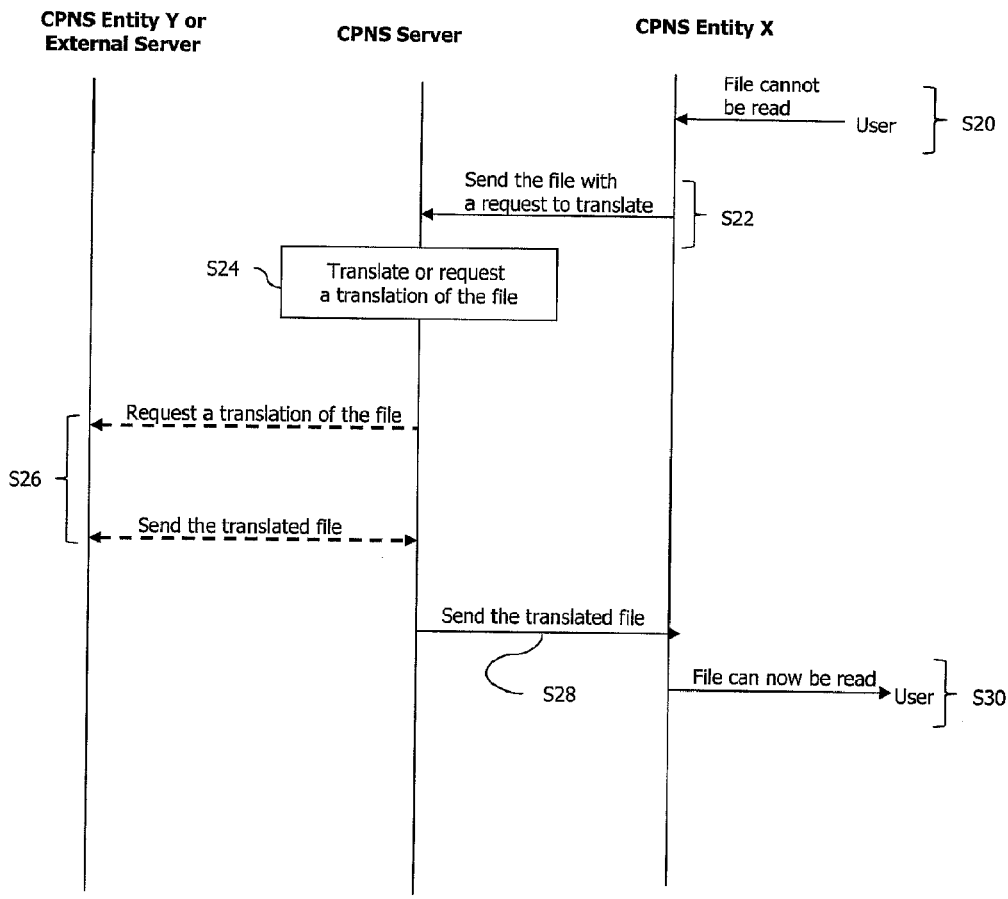

METHOD AND SYSTEM FOR OPTIMIZING CPNS ENABLER

This application is the National Phase of PCT/KR 2010/003058 filed on May 14, 2010, which claims priority under 35 U.S.C. 119(e) to U.S. Provisional Application No. 61/179,000 filed on May 17, 2009, all of which are hereby expressly incorporated by reference into the present application.

TECHNICAL FIELD

The present invention relates to optimizing the resources of a CPNS (Converged Personal Network Service) enabler.

BACKGROUND ART

Among various technologies being developed, Converged Personal Network Service (CPNS) is a service that allows devices in one Personal Network (PN) to access services outside that PN, e.g., another PN or other network. Generally the CPNS is implemented by a CPNS enabler which can include a CPNS server, one or more Gateways (GWs), and one or more PNEs (Personal Network Elements). A PN GW generally connects one PN to another PN, e.g., using a mobile communication network. A PNE is basic component that makes up a PN, and can be a single device or a group of devices. These components and general operations of the CPNS are also discussed in Open Mobile Alliance (OMA) telecommunications standards documents.

FIG. 1 illustrates an example of a CPNS enabler according to a related art. As shown in FIG. 1, a CPNS server can communicate and exchange data with one or more PN gateways, each of which in turn can communicate and exchange data with one or more PNEs in a PAN (Personal Area Network).

Each of the PNEs can communicate and exchange data with the PN gateways, other devices or PNEs in other networks, etc. Each of the PN gateways can communicate and exchange data with the CPNS servers, other PN gateways, PNEs, etc. Each CPNS server can also communicate with other servers, gateways, etc. For instance, the CPNS server and the PN gateway (e.g., mobile phone) can communicate with each other through a cellular network, while the PN gateway can communicate with the PNEs through the WPAN such as Bluetooth, NFC, WiBree, Wi-Fi, etc. Generally communications between the CPNS servers, gateways, and PNEs are carried out using known networks and techniques, e.g., Bluetooth, 802.11, Wi-Fi, WPAN (Wireless Personal Area Network), cellular networks such as 3GPP, etc.

The CPNS server generally manages and controls communications among the PN gateways and PNEs so that applications and information among these units of the CPNS enabler can be shared with each other to enhance the user experience. For instance, in FIG. 1, according to the CPNS service of the CPNS enabler, a user at one PNE (e.g., Portable Multimedia Player—PMP) can view GPS (Global Positioning System) information which is received from another PNE (e.g., GPS device) through a PN gateway (e.g., cellular phone). As a result, the user can have access to a more variety of services that are offered within the user's current PAN as well as outside the PAN.

There is, however, a limitation associated with the CPNS enabler. Although the units of the CPNS enabler may communicate with each other, each CPNS server, gateway or PNE/Device can only carry out functions according to its own capabilities and is thus limited to the hardware/software provided therein. For instance, a CPNS gateway such as a mobile terminal may provide a video playing function but such video playing is limited to the video playing software/application stored therein. If that video playing application plays videos that have an MPEG format, then the CPNS gateway can play only the videos of MPEG format and cannot play videos of other formats even if the videos of other formats are received by the CPNS gateway. This limits the services that can be provided by the CPNS enabler.

DISCLOSURE OF INVENTION

Solution to Problem

The present invention provides an enhanced Converged Personal Network Service (CPNS) enabler which addresses the limitations and disadvantages associated with the related art.

The present invention provides a CPNS enabler with functionalities that are enhanced or optimized by sharing capabilities of the units of the CPNS enabler.

The present invention provides an optimized CPNS enabler which allows data format conversions/translations through CPNS units having such capabilities.

According to one aspect, the present invention provides a method for providing content translation in a CPNS enabler, the CPNS enabler including a CPNS server and a plurality of CPNS entities, the method performed by the CPNS server and comprising: receiving content translation capability information and function information from each of the CPNS entities; compiling CPNS translator information for the CPNS enabler based on the content translation capability information and the function information; receiving a request to translate a content along with the content from a certain CPNS entity among the CPNS entities; determining whether the CPNS server can translate the content in response to the request based on the CPNS translator information; translating the content if the determining step indicates that the CPNS server can translate the content; and transmitting the translated content to the certain CPNS entity.

According to another aspect, the present invention provides a CPNS server device for providing content translation in a CPNS enabler, the CPNS enabler including the CPNS server device and a plurality of CPNS entities, the CPNS server device comprising: a receiver unit; and a controller cooperating with the receiver unit and configured to receive content translation capability information and function information from each of the CPNS entities, to compile CPNS translator information for the CPNS enabler based on the content translation capability information and the function information, to receive a request to translate a content along with the content from a certain CPNS entity among the CPNS entities, to determine whether the CPNS server device can translate the content in response to the request based on the CPNS translator information, to translate the content if the determination indicates that the CPNS server device can translate the content, and to transmit the translated content to the certain CPNS entity.

These and other features of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF DRAWINGS

The present invention will become more fully understood from the detailed description given hereinbelow and the accompanying drawings which are given by way of illustration only, and thus are not limitative of the present invention and wherein:

FIG. 4 is an example of translator information which can be stored in a CPNS server according to an embodiment of the invention; and FIG. 5 is a flow diagram illustrating a method of translating contents/data in a CPNS enabler according to an embodiment of the invention.

MODE FOR THE INVENTION

Figure 1:
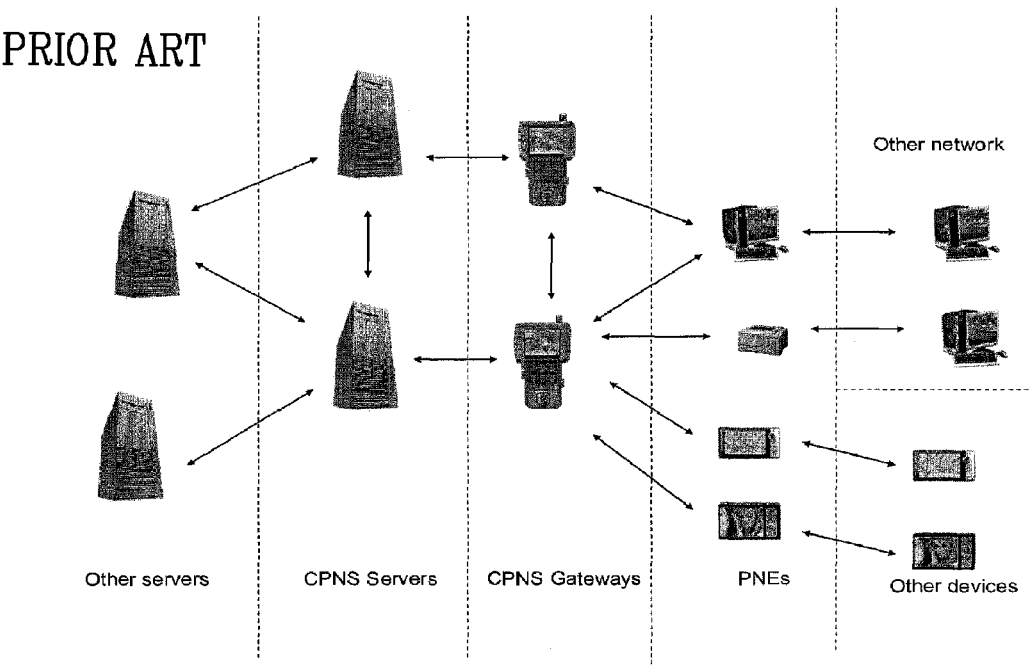
FIG. 1 is a diagram of a CPNS enabler according to a related art.

Hereinafter, exemplary embodiments of the invention will be described in detail with reference to the attached drawings. The embodiments described below are intended to exemplify the technical spirit of the invention, but are not intended to limit the scope of the invention.

The embodiments of the present invention provide an enhanced CPNS enabler in which a CPNS server can obtain and store configuration/connection information about the various units of the CPNS enabler as well compile and store translator information for each unit of the CPNS enabler. This can occur preferably in an idle mode. The CPNS server then can use one or more of the stored information to translate contents by itself or to obtain a translation of the contents from applicable unit(s) of the CPNS enabler, whereby the functionality of the CPNS enabler can be optimized. The act of translating or providing the translation can occur preferably in an active mode. As a result, a user can continue to receive a desired service/operation by using the functions of at least one of the units of the CPNS server.

According to an embodiment, a 'translation' of a content can include converting or changing a format (or other characteristic) of a content from one format to another. The content can be data, video, audio, information, file, packets, streams, etc. and can be in any shape or form. Further, a translation of a content can be composed of a single transition of the content or of a series of translations of the content. For instance, a translation of content from format A to B can mean translating the content from format A directly to format B, or can mean translating the content from format A to C and then from C to B.

According to an embodiment, a CPNS enabler preferably includes at least one CPNS server and a plurality of CPNS entities. The CPNS server and CPNS entities are also referred to herein as the units of the CPNS enabler or CPNS units. The CPNS entity is referred to herein as merely an entity and can be a CPNS gateway (or PN gateway) or PNE (or Device coupled to the PNE). Some examples of the PNEs can be a handset or mobile terminal, GPS, navigation device, MP3 player, audio/video player, PMP (Portable Multimedia Player), handset with GPS, PC (Personal Computer), desktop, computer notebook, printer, computer tablet, scanner, etc. Some examples of the PN gateways can be a mobile terminal or handset, home gateway, smart phone, set top box, computer notebook, etc. Each CPNS unit has preset or predefined capabilities associated with the hardware/software provided therein, which allows each CPNS unit to provide specific functions.

According to an embodiment, the invention provides a method of enhancing functionalities of the CPNS enabler, and more specifically, a method of providing enhanced content translation functions in a CPNS enabler. The CPNS server obtains and stores configuration information of the CPNS enabler in an idle mode (e.g., non-active mode). Further, the CPNS server obtains content translation capability information and function information from each of the CPNS entities. The content translation capability information can indicate capabilities of a corresponding CPNS entity to translate a content. The function information can indicate function(s)/operations(s) that can be performed by the corresponding CPNS entity. Then the CPNS server can compile CPNS translator information based on the obtained content translation capability information and the obtained function information. The translator information indicates a list of translations that are possible in the CPNS enabler. In this regard, the translator information can include the content translation capability information and the function.

The CPNS server can also update the content translation capability information, the function information, the translator information, and/or the configuration information at certain time intervals or as needed, and stores the updated information. The configuration information can be represented and continuously stored in the CPNS server in a graphical form, but can be stored in other forms. The configuration information can provide information about the architecture of the units of the CPNS enabler as well as their connections. The CPNS server also can store policy information and/or user preference information associated with each or some of the units of the CPNS enabler.

Then the CPNS server utilizes the stored information such as the CPNS translator information to provide a translation of a content. For instance, a particular CPNS entity may send a content it desires to process (e.g., reproduce or play) but is not able to due to its limitations (e.g., it does not have the hardware/software capabilities to do that). Thus the particular CPNS entity can send such a content to the CPNS server. Then CPNS server then can check if the CPNS server itself can translate the content into a format that can be processed by the particular CPNS entity. If the CPNS server is not able to, then the CPNS server checks the stored translator information to determine if any of the CPNS units can provide an appropriate translation of the content for the particular CPNS entity.

If the CPNS server determines that one or more of the CPNS units can provide an appropriate translation of the content, the CPNS server then sends the content to be translated with the instructions to translate to the one or more CPNS units and wait for the translated content from any one of the CPNS units, or can select one among the multiple CPNS units and send the content with the translation request to the selected CPNS unit. The one or more CPNS units perform the translation(s) of the content as needed so that the content can be converted into a format that can be processed by the particular CPNS entity. The CPNS server then routes the translated content to the particular CPNS entity, which in turn processes (e.g., reproduces, copies, edits, etc.) the received translated content as desired. Accordingly, the content which initially could not be processed by the particular CPNS entity, is processed by the particular CPNS entity due to the sharing of the translation capabilities of other CPNS unit(s)/entities in the CPNS enabler.

Now having described some concepts of the invention, various embodiments of the invention will be discussed now in more detail referring to specific examples and figures.

Figure 2:
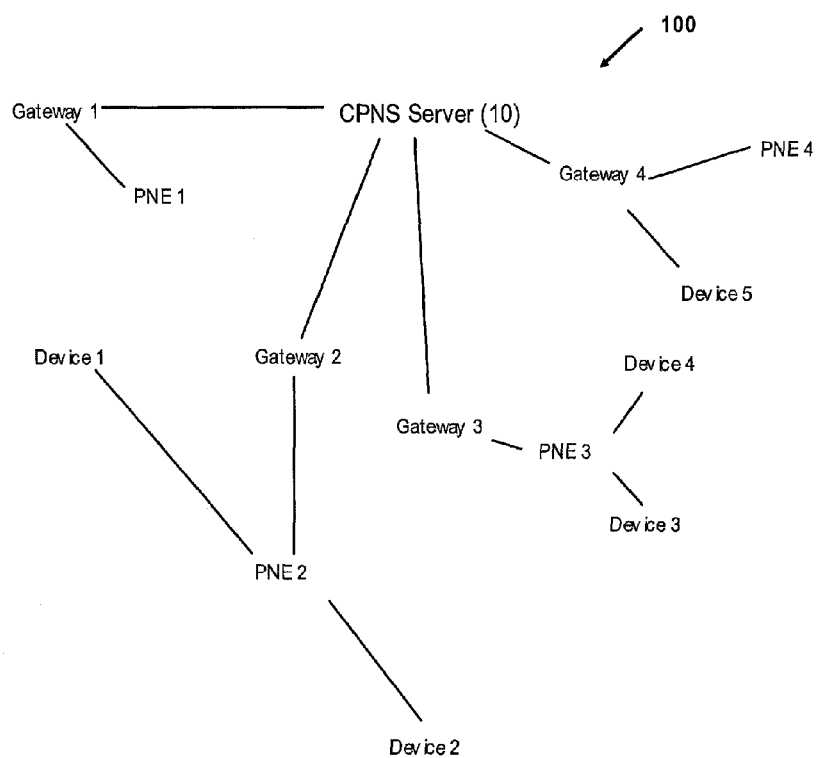
FIG. 2 is a graph illustrating one example of the configurations of a CPNS enabler according to an embodiment of the invention.

FIG. 2 is a graph illustrating the configurations of a CPNS enabler 100 according to an embodiment of the invention. As shown in FIG. 2, the CPNS enabler 100 can include a CPNS server 10, a plurality of gateways (Gateway 1 through Gateway 4), a plurality of PNEs (PNE 1 through 4), and a plurality of devices (Devices 1 through Device 5). All the units of the CPNS enabler 100 are operatively coupled and configured, and communicate amongst each other as configured using known networks and techniques, e.g., Bluetooth, 802.11, Wi-Fi, WPAN (Wireless Personal Area Network), cellular networks such as 3GPP, etc. Further, a gateway can become and function as a PNE and vice versa. The Devices of the CPNS enabler 100 can also be PNEs or devices coupled to the PNEs. Each CPNS unit can include various known components such as a receiver/transmitter, a controller/processor, an input unit, etc. For instance, the CPNS server can include a receiving unit, a transmitting unit, a controller, a storage unit, etc. for carrying out the methods of the invention.

In an idle mode, the CPNS server 10 obtains information about the configuration, connections, architecture, etc. of the CPNS enabler 100, and store such information in a storage unit (or database). The storage unit can reside at the CPNS server 10 or can be at another location. Although specific names may be given, each unit of the CPNS enabler 100 can be identified by a specific number in bracket, such as:

Gateway [1] to Gateway [n], where n is a positive integer;
PNE [x,1] to PNE [x,m], where 1=<x<=n and m is a positive integer; and
—Device [x,y,1] to Device [x,y,p], where 1=<x<=n, 1=<y<=m and p is a positive integer.

For each entity (e.g., gateway, PNE, or Device) of the CPNS enabler 100, the CPNS server 10 preferably stores static information and/or dynamic information as applicable. The CPNS server 10 can also store static and/or dynamic information about itself. Static information is information that is fixed or changes rarely, whereas the dynamic information is information that changes regularly, in real time, or as needed. For instance, the static information can be information on the size of the screen (e.g., size of the laptop if the PNE is the laptop), wireless features (e.g., use of Bluetooth, Wi-Fi, etc.), codec information (e.g., use of MP4, DivX, H624 for video coding, etc.), size of the battery the CPNS unit has, capabilities and functions of the CPNS unit, etc. The dynamic information can be information about the current level of the battery of the CPNS unit, the state of the CPNS unit (e.g., current mode of the CPNS unit), the current state of wireless connection of the CPNS unit, etc.

The static information is preferably obtained and updated during the idle mode of the CPNS unit. For instance a controller or Device Management (DM) in each CPNS entity can be configured to send certain information (connection information with other entities) to the CPNS server 10. The dynamic information can be provided at a requested time, or at regular times, or in real time. The CPNS server 10 then compiles such information in association with the corresponding CPNS entity (which can be individually identified as shown in the above example).

The CPNS server 10 can store the static information and dynamic information for all the CPNS entities and for itself in the storage unit. Furthermore, the CPNS server 10 can store user preference information and/or operator policy information for the CPNS entities and itself. The user preference information may indicate a user's preference of using one entity over another entity, which may vary depending on a specific function being performed. For instance, the CPNS server 10 can store that a user of PNE 1 to PNE 3 prefers to use PNE 2 over the other PNEs when playing a video, if all PNE 1 to PNE 3 can play the video therein. The operator policy information may indicate that a user may not have access to certain devices for specific functions, or may indicate an administrator/operator's preference in using one entity over others (e.g., to minimize bandwidth use, etc.). The user preference information and operator policy information may vary depending on the CPNS units or groups thereof, or may be the same for the CPNS enabler 100.

The CPNS server 10 can store the static information and the dynamic information in various forms. In one example, such information and other information is stored in a graphical form as shown in FIG. 2. The configurations/connections of the units of the CPNS enabler 100 are indicated by the solid lines. Obviously, this is one example of the tree form and other types of trees or other graphical forms may be used to represent the configurations and other information about the CPNS enabler 100. Once the CPNS server 10 stores such graphs/information therein initially, then the graphs can be updated in real time or as desired, in the CPNS server 10.

In addition to (or lieu of) the connection information (e.g., static and/or dynamic information) for the CPNS units, the CPNS server 10 stores content translation capability information and function information from each of the CPNS entities. The content translation capability information and function information can be part of the static and/or dynamic information, and can be obtained by the CPNS server 10 from each of the CPNS entities. The CPNS server 10 also stores therein its own content translation capability information and function information. Based on the stored content translation capability information and function information, the CPNS server 10 compiles CPNS translator information which identifies all possible content translation capabilities of the CPNS enabler by use of one or more CPNS entities' translation capabilities. An example of this process is discussed below by referring to FIG. 3.

Figure 3:
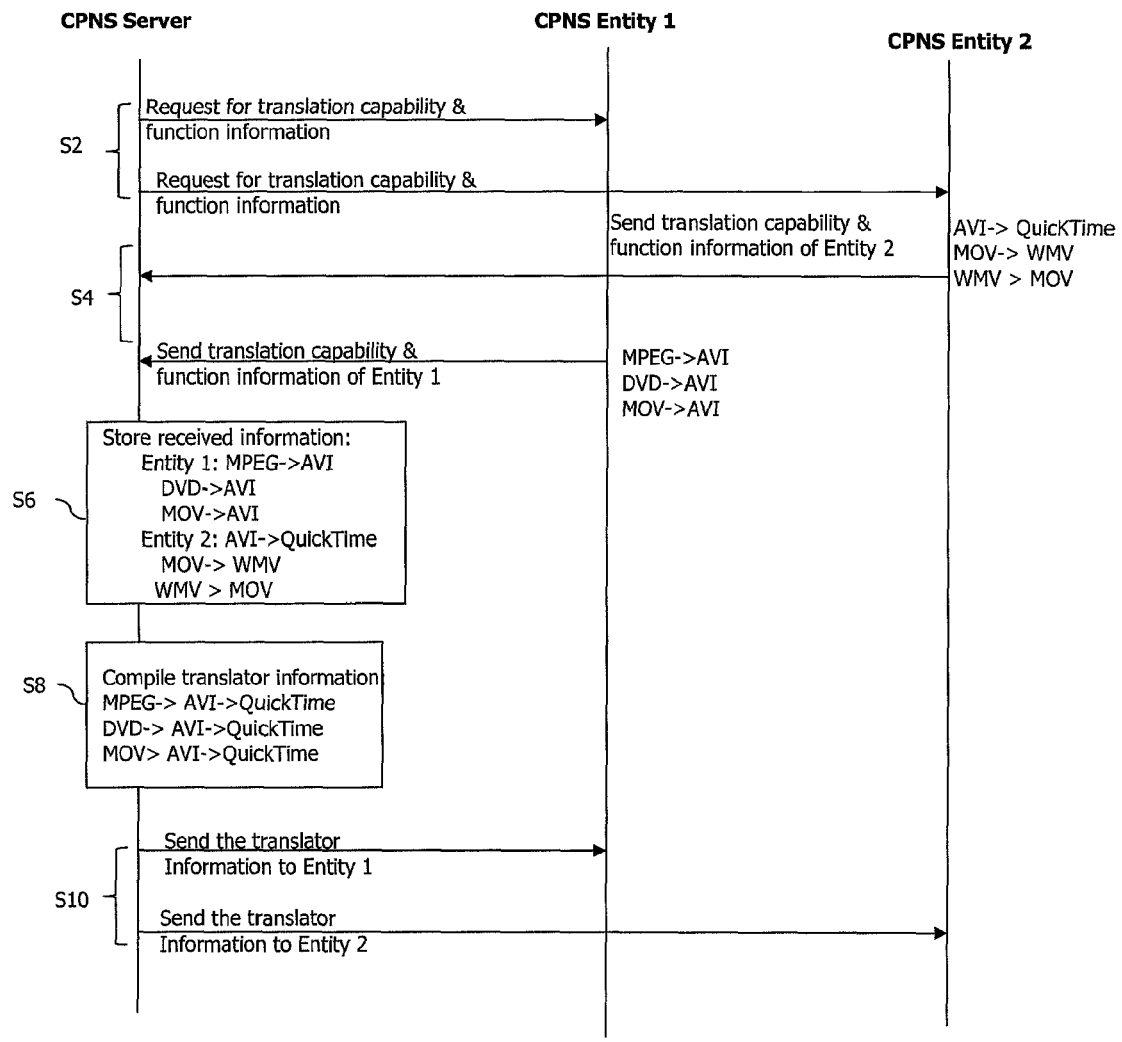
FIG. 3 is a flow diagram illustrating a method of compiling and storing translator information for a CPNS enabler according to an embodiment of the invention.

FIG. 3 is a flow diagram illustrating a method of compiling and storing CPNS translator information for a CPNS enabler according to an embodiment of the invention. In FIG. 3, assume that a CPNS enabler in this example includes a CPNS server and entities 1 and 2 (e.g., gateway, PNE, Device, etc.).

Referring to FIG. 3, at an initial stage in step S2, the CPNS server sends a request message to each of all CPNS entities of the CPNS enabler. The request message requests each CPNS entity to send its content translation capability information and function information.

At step S4, in response to the request message, each of the CPNS entities (e.g., entities 1 and 2) sends its own translation capability and function information to the CPNS server, via using known communication techniques. For instance, assume that the entity 2 can process (e.g., record, reproduce, edit, copy, etc.) contents (e.g., videos) that are in video formats—QuickTime, WMV (Windows Media Video) and MOV (file extension) (all of which would be the function information), and can convert contents from AVI (Audio Video Interleave) format to QuickTime format, MOV to WMV format, and WMV to MOV format (all of which would the content translation capability information). Then the entity 2 sends such information to the CPNS server. Similarly, assume that the entity 1 can process (e.g., record, reproduce, edit, copy, etc.) contents (e.g., videos) that are in video formats—AVI (which would be the function information), and can convert contents from MPEG format to AVI, DVD (Digital Video/Versatile Disc) format to AVI, and MOV to AVI (all of which would the content translation capability information). Then the entity 1 sends such information to the CPNS server.

At step S6, the CPNS server gathers the content translation capability information and function information received from each of the CPNS entities 1 and 2, and stores it its database or storage unit. The CPNS server also stores therein its own content translation capability information and function information.

At step S8, based on the content translation capability information and function from each of the CPNS entities and the CPNS server itself, the CPNS server compiles or formulates translator information for the CPNS enabler by analyzing the content translation capability information and function information of all CPNS units including the CPNS server if applicable. In this regard, the CPNS server may also store content translation capability information and function information of an external server (different from the CPNS server) and use such information in compiling the translator information. The translator information can indicate all possible translation capabilities that can be provided by the CPNS enabler. In this example, the CPNS server's capability is not considered. For instance, by analyzing the collected content translation capability information and function information, the CPNS server determines that all following content translations are possible in the CPNS enabler using the CPNS entities 1 and 2 and formulates the following translator information for the CPNS enabler:

MPEG→AVI→QuickTime
DVD→AVI→QuickTime
MOV→AVI→QuickTime

As mentioned above, the translator information indicates all possible translation capabilities of the CPNS enabler using one or more CPNS units. In generating the translator information, the CPNS server can summarize all the function information and translation capability information with their characteristics from each of the CPNS units involved. The CPNS server also links some or all the functions identified in the function information with the translation capabilities of the CPNS units to increase the translation possibilities of the CPNS enabler. For example, in the above example as shown in FIG. 3, since the entity 1 can translator a format of the contents from MPEG to AVI (MPEG→AVI) and the entity 2 can translator a format of the contents from AVI to QuickTime (AVI→QuickTime), the CPNS enabler has the (MPEG→AVI→QuickTime) translator by using the entities 1 and 2.

The compiled translator information for the CPNS enabler is then stored in the CPNS sever.

At step S10, the CPNS server can send the translator information to each of the CPNS entities. The CPNS server can send this automatically or upon request from the CPNS entity. In this regard, the CPNS server sends to each of the CPNS units the list of all translation possibilities or a part thereof in the CPNS. That is, the CPNS server may send the entire translator information for the entire CPNS enabler to each CPNS unit, or send only a relevant part of the translator information for each CPNS unit to a respective CPNS unit. For example, if a CPNS unit can display a QuickTime file, the CPNS server may send to this unit a list of translation possibilities (and combining translation possibilities) with a QuickTime output (for example: AVI->QuickTime, MPEG->AVI->QuickTime, DVD->AVI->QuickTime, MOV->AVI->QuickTime). But the CPNS server may not send this list to other CPNS units that do not have a QuickTime display capability. On the other hand, another CPNS unit having an MPEG display capability may only receive a list of translation possibilities with an MPEG output.

FIG. 4 is an example of the content translation capability information and function information, which can be stored in a CPNS server according to an embodiment of the invention. Such information can be stored in step S6 of FIG. 3, and can be part of the CPNS translator information.

As shown in FIG. 4, for each CPNS unit (e.g., CPNS server, GW, PNE, Device, etc.), the function information (identifying the functions) and the content translation capability information (identifying the translators) for each CPNS unit may be stored in the CPNS server. Further, the information for an external server (different from the CPNS server) may be stored in the CPNS server.

Once the translator information is compiled and stored in the CPNS server and may be sent to the CPNS units as discussed above in connection with FIGS. 3 and 4, the translator information is then used to provide an enhanced translation capability to the CPNS enabler.

More specifically, FIG. 5 is a flow diagram illustrating a method of translating contents in a CPNS enabler according to an embodiment of the invention.

Referring to FIG. 5, at step S20, when a user at a CPNS entity X (e.g., mobile terminal) wants to access or process a file (e.g., read an MPEG file), the entity X is not able to because it does not have the MPEG function/capability but instead has a QuickTime application. Then the entity X checks the translator information which was received from the CPNS server and stored in the entity X according to the methods discussed above, e.g., in connection with FIGS. 3 and 4. The entity X then determines that the file can be converted/translated into the format it can access (e.g., the QuickTime format) based on the translator information.

At step S22, the entity X then sends the file to the CPNS server with an instruction to translate. The instruction may also indicate the preferred converted-to format, i.e., in this example, the QuickTime format.

At step S24, upon receipt of the file and the instruction, the CPNS server initiates the translation process. In this regard, according to the translator information, the CPNS server may determine that the CPNS server itself can perform the translation directly and if so, translates the file and sends the translated file (e.g., converted from MPEG to QuickTime) to the CPNS entity X. If the CPNS server determines that the CPNS server cannot translate, then the CPNS server checks the translator information and determines which other CPNS entity (or even external server) can perform the requested translation. In another variation, according to the translator information, the CPNS server may decide to translate directly or may instruct another CPNS entity or external server to perform the translation.

At step S26, if the CPNS server determines that a CPNS entity Y (or external server/device) can performed the requested translation, the CPNS server sends the file with the translation instruction to the CPNS entity Y/external server. The CPNS entity Y (or external server) then translates the file into the desired format (i.e., QuickTime) and sends the translated file to the CPNS server. If multiple CPNS entities can perform the requested translation, the CPNS server may use the preference information and/or operator policy information, which may be stored therein, to select a particular CPNS entity over others. As a variation, if multiples CPNS entities can perform the requested translation, the CPNS server may send the file with the translation instructions to all applicable CPNS entities and then wait to receive the translated file from any one of the entities.

At step S28, the CPNS server sends the translated file to the CPNS entity X.

At step S30, the CPNS entity X receives the translated file (converted from MPEG to QuickTime) and since the CPNS entity X can read the QuickTime files, the CPNS entity X can now read and process the translated file. This enhances the user experience significantly since the user is now able to access the file at the CPNS entity X.

Accordingly, the present invention allows an enhanced CPNS enabler which provides a variety of different functions and capabilities by sharing the functions and capabilities of the units of the CPNS enabler.

The present invention has been explained with reference to the embodiments which are merely exemplary. It will be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

The invention claimed is:

1. A method for providing content translation in a Converged Personal Network Service (CPNS) enabler, the CPNS enabler including a CPNS server and a plurality of CPNS entities, the method performed by the CPNS server and comprising:
receiving content translation capability information and function information from each of the CPNS entities;
compiling CPNS translator information for the CPNS enabler based on the content translation capability information and the function information;
receiving a request to translate a content along with the content from a certain CPNS entity among the CPNS entities;
determining whether the CPNS server can translate the content in response to the request based on the CPNS translator information;
translating the content if the determining step indicates that the CPNS server can translate the content; and
transmitting the translated content to the certain CPNS entity.

2. The method of claim 1, further comprising:
determining which one of the CPNS entities can translate the content if the determining step indicates that the CPNS server cannot translate the content, so as to identify a CPNS entity that can translate; and
transmitting a request to translate the content along with the content to the identified CPNS entity.

3. The method of claim 2, further comprising:
receiving the translated content from the identified CPNS entity in response to the request; and
transmitting the received translated content to the certain CPNS entity.

4. The method of claim 2, wherein each of the certain CPNS entity and the identified CPNS entity is a CPNS gateway or a PNE (Personal Network Element).

5. The method of claim 1, wherein the CPNS entities include at least one CPNS gateway and at least one PNE (Personal Network Element).

6. The method of claim 1, further comprising:
transmitting the entire CPNS translator information to each of the CPNS entities.

7. The method of claim 1, further comprising:
transmitting a respective part of the CPNS translator information to each of the CPNS entities.

8. The method of claim 1, wherein the CPNS translator information includes a list of all possible translations that can be provided in the CPNS enabler.

9. The method of claim 1, wherein the CPNS translator information includes a list of the content translation capability information and function information received from each of the CPNS entities.

10. The method of claim 1, further comprising:
receiving content translation capability information and function information from an external server; and
compiling the CPNS translator information for the CPNS enabler based on the content translation capability information and function information received from the external server and the CPNS entities.

11. A Converged Personal Network Service (CPNS) server device for providing content translation in a CPNS enabler, the CPNS enabler including the CPNS server device and a plurality of CPNS entities, the CPNS server device comprising:
a receiver unit; and
a controller cooperating with the receiver unit and configured to receive content translation capability information and function information from each of the CPNS entities, to compile CPNS translator information for the CPNS enabler based on the content translation capability information and the function information, to receive a request to translate a content along with the content from a certain CPNS entity among the CPNS entities, to determine whether the CPNS server device can translate the content in response to the request based on the CPNS translator information, to translate the content if the determination indicates that the CPNS server device can translate the content, and to transmit the translated content to the certain CPNS entity.

12. The CPNS server device of claim 11, the controller further configured to:
determine which one of the CPNS entities can translate the content if the determination indicates that the CPNS server device cannot translate the content, so as to identify a CPNS entity that can translate; and
transmit a request to translate the content along with the content to the identified CPNS entity.

13. The CPNS server device of claim 12, the controller further configured to:
receive the translated content from the identified CPNS entity in response to the request; and
transmit the received translated content to the certain CPNS entity.

14. The CPNS server device of claim 12, wherein each of the certain CPNS entity and the identified CPNS entity is a CPNS gateway or a PNE (Personal Network Element).

15. The CPNS server device of claim 11, wherein the CPNS entities include at least one CPNS gateway and at least one PNE (Personal Network Element).

16. The CPNS server device of claim 11, the controller further configured to:
transmit the entire CPNS translator information to each of the CPNS entities.

17. The CPNS server device of claim 11, the controller further configured to:
transmit a respective part of the CPNS translator information to each of the CPNS entities.

18. The CPNS server device of claim 11, wherein the CPNS translator information includes a list of all possible translations that can be provided in the CPNS enabler.

19. The CPNS server device of claim 11, wherein the CPNS translator information includes a list of the content translation capability information and function information received from each of the CPNS entities.

20. The CPNS server device of claim 11, the controller further configured to:
 receive content translation capability information and function information from an external server; and
 compile the CPNS translator information for the CPNS enabler based on the content translation capability information and function information received from the external server and the CPNS entities.

* * * * *